GEORGE W. PITTMAN.
CORN & COTTON SEED PLANTER.

106202

Patented Aug 9 1870

Witnesses:
Geo. A. Lownds
James H. Tucker

Inventor:
George W. Pittman
by Chas. C. Tucker & Co.
his Att'ys

United States Patent Office.

GEORGE W. PITTMAN, OF WINONA, MISSISSIPPI.

Letters Patent No. 106,202, dated August 9, 1870.

IMPROVEMENT IN CORN-PLANTERS.

The Schedule referred to in these Letters Patent and making part of the same

I, GEORGE W. PITTMAN, of Winona, in the county of Carroll and State of Mississippi, have invented certain Improvements in Corn-planting Machine, of which the following is a specification.

Nature and Objects of my Invention.

My invention relates to a corn-planter, the object of which is to make a furrow, to deposit the corn in it, and to cover it up by one and the same act, and at one and the same time, thus dispensing with all extra labor and time required by the old method.

A furrow is opened with a plow-share, attached in the center of the machine, into which the corn is dropped regularly, immediately after, by means of a feeder and conductor in the center of the machine, and then covered over by means of a harrow or drag in the rear.

Description of the Accompanying Drawing.

General Description.

Figure 1:
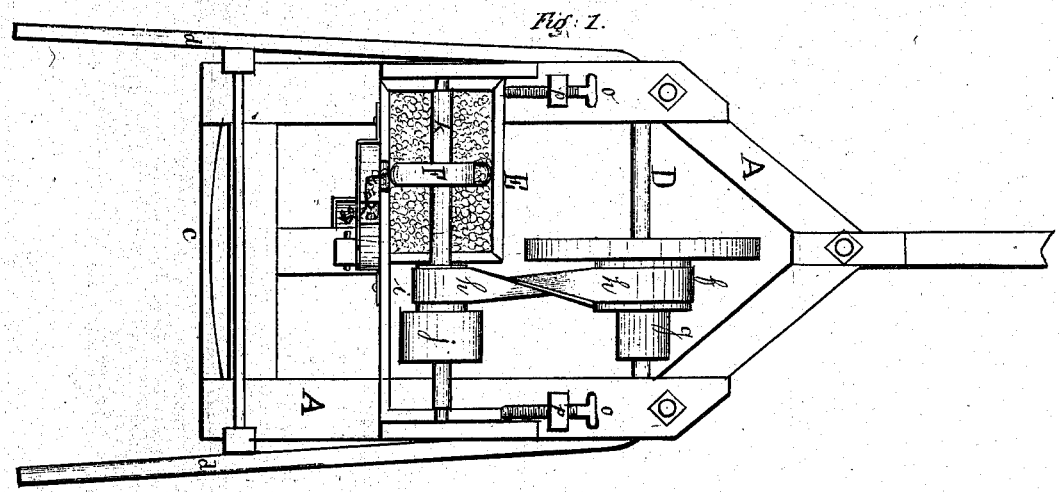
Figure 1 is a plan view of the machine, embodying my invention, with the corn-feeder and accompanying parts attached.
Figure 2:
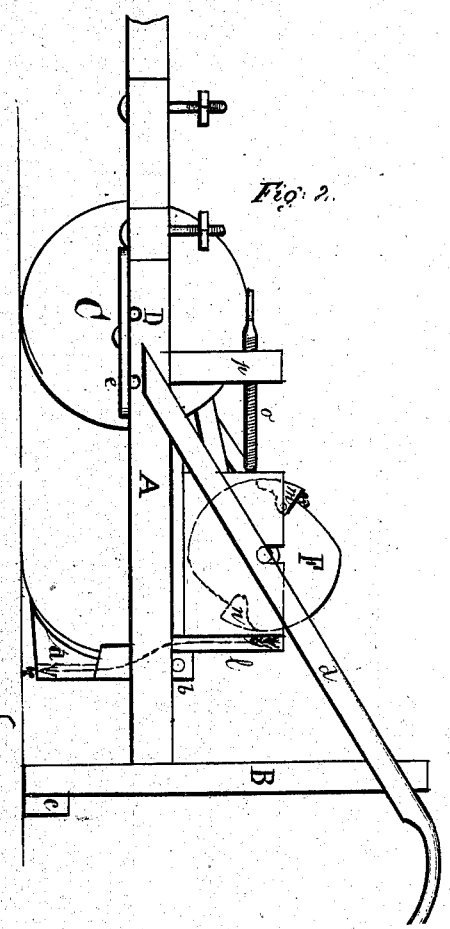
Figure 2 is a side view of the same.

My invention consists of a frame, A, as shown in figs. 1 and 2, to the back end of which are attached two upright posts, B, and forward of its center the wheel C.

Back of its center is attached the plow-share a, which can be raised or lowered, by means of the pin b, for the purpose of making either a deep or shallow furrow.

To the bottom of the two upright posts B is attached the drag c, with a curved hollow in its center. This drag gathers up the earth, which has been thrown on each side of the furrow, and throws it back over the seed, which drops in between it and the plow-share, and leaves the land smooth.

On each side of the frame two handles, d, are attached, similar to those of a plow, for the purpose of guiding the machine, as shown in fig. 2.

The wheel C is placed upon a shaft, D, which runs in two grooves in the bottom of the frame, and is held in its place by means of two journals, e, as shown in fig. 2.

Upon the right side of the wheel are two conical pulleys, f and g, upon which a belt, h, runs, connecting with similar pulleys, i and j, in the rear, arranged inversely.

Upon top of the frame, in its center, is a box, E, divided into two sections.

On the top of this box, in the center, are three grooves, in which runs a shaft, k, similar to the one in front.

In the right section of the box, upon this shaft, are the two conical pulleys i and j, connected with those forward, by the belt, as stated.

In the left section of this box, in the center, upon the shaft, is a wheel, F, with two buckets, m and n, attached equidistant.

The corn is placed in this section, and, when the machine is in motion, is carried up and backward by these buckets, and deposited in the pipe or conductor l, and through it dropped into the furrow below, at regular intervals.

The box is held in its place by means of two screws, o, through two upright posts, p, immediately in front of the box, acting in connection with the belt upon the pulleys, and which also regulate the tension of the belt.

The distance of planting the corn apart can be regulated by changing the belt from one pulley to the other.

Claim.

I claim as my invention—

The frame A, with the two upright posts B and handles d attached, with the drag c at the bottom, in combination with the wheel C and conical pulleys f and g upon the shaft D, operating by means of the belt h upon the inverse conical pulleys i and j, and feed-wheel F, with buckets m and n attached, in connection with the box E, secured by the screws o, and the conductor l and plow-share a in its front, as and for the purposes hereinbefore set forth.

GEORGE W. PITTMAN.

Witnesses:
R. B. WOOLEY,
SAMUEL BRANDON.